United States Patent
Azhagesan

(10) Patent No.: US 8,702,136 B2
(45) Date of Patent: Apr. 22, 2014

(54) VEHICLE DOOR PROTECTOR

(76) Inventor: Muthukumaran Azhagesan, Wayne, PA (US)

( * ) Notice: Subject to any disclaimer, the term of this patent is extended or adjusted under 35 U.S.C. 154(b) by 0 days.

(21) Appl. No.: 13/563,109

(22) Filed: Jul. 31, 2012

(65) Prior Publication Data

US 2014/0033612 A1 Feb. 6, 2014

(51) Int. Cl.
*B60R 19/42* (2006.01)

(52) U.S. Cl.
USPC .......................................... 293/128; 293/126

(58) Field of Classification Search
USPC ............... 49/460, 463, 70, 502; 293/126, 128
See application file for complete search history.

(56) References Cited

U.S. PATENT DOCUMENTS

| | | | | |
|---|---|---|---|---|
| 3,540,773 | A * | 11/1970 | Settle et al. | 296/152 |
| 4,313,987 | A * | 2/1982 | McCormick | 428/40.1 |
| 4,530,519 | A * | 7/1985 | Marshall | 280/770 |
| 4,561,685 | A * | 12/1985 | Fischer | 293/128 |
| 4,635,996 | A * | 1/1987 | Hirose | 296/136.07 |
| 4,639,027 | A | 1/1987 | Boyd | |
| 4,750,767 | A * | 6/1988 | Barnett | 293/128 |
| 4,810,013 | A | 3/1989 | Spears | |
| 4,810,015 | A * | 3/1989 | McNeil | 293/128 |
| 4,896,911 | A * | 1/1990 | Duke | 293/128 |
| D312,237 | S * | 11/1990 | Avery | D12/190 |
| 4,974,892 | A * | 12/1990 | Huard | 293/128 |
| 5,035,460 | A * | 7/1991 | Huang | 296/95.1 |
| 5,050,925 | A * | 9/1991 | Brown | 296/136.03 |
| 5,112,092 | A * | 5/1992 | Pucci | 293/128 |
| 5,129,695 | A | 7/1992 | Norman, II | |
| D328,884 | S * | 8/1992 | Schaller | D12/167 |
| 5,149,166 | A | 9/1992 | Wille et al. | |
| 5,275,460 | A * | 1/1994 | Kraus | 296/136.13 |
| 5,531,500 | A * | 7/1996 | Podvin | 296/152 |
| 5,799,992 | A * | 9/1998 | Kojima | 293/128 |
| 6,062,617 | A * | 5/2000 | Marks | 293/128 |
| 6,093,466 | A * | 7/2000 | Steinke et al. | 428/40.1 |
| 6,203,095 | B1 * | 3/2001 | Peterson | 296/136.02 |
| 6,254,170 | B1 | 7/2001 | Farmer et al. | |
| 6,406,080 | B1 * | 6/2002 | Davis | 293/128 |
| 6,415,832 | B1 * | 7/2002 | Ricks | 150/166 |
| 6,457,755 | B1 * | 10/2002 | Nieto | 293/128 |
| 6,481,782 | B2 * | 11/2002 | Bond | 296/187.07 |
| D485,528 | S * | 1/2004 | Gray | D12/401 |
| 6,736,435 | B1 * | 5/2004 | Ditthavong | 293/128 |
| 6,769,725 | B2 * | 8/2004 | Ko | 293/128 |
| 7,090,266 | B1 * | 8/2006 | Price | 293/128 |
| 8,109,557 | B1 * | 2/2012 | Salinas | 296/97.23 |
| 8,465,053 | B2 * | 6/2013 | King, IV | 280/770 |
| 2003/0062732 | A1 * | 4/2003 | Molina | 293/128 |
| 2003/0146630 | A1 * | 8/2003 | Ko | 293/128 |
| 2006/0220400 | A1 * | 10/2006 | Diamond | 293/126 |
| 2007/0108780 | A1 * | 5/2007 | Udolph | 293/128 |
| 2007/0278804 | A1 * | 12/2007 | Shields | 293/128 |
| 2008/0258482 | A1 * | 10/2008 | Udolph | 293/128 |
| 2010/0109308 | A1 * | 5/2010 | Gordon | 280/770 |

* cited by examiner

*Primary Examiner* — Katherine Mitchell
*Assistant Examiner* — Justin Rephann

(57) ABSTRACT

A vehicle door protector that includes a lightweight single unit construction shell member configured to overlie and superimpose substantially the entire exterior of a sole vehicle door, said shell member having a durable exterior surface and a pliable interior surface, wherein the shell member is releasably securable to the vehicle door by means of a plurality of securing straps, whereby the finish and paintwork of the vehicle door to which the device is attached is protected from dings, dents, scratches and other blemishes rendered thereto by the opening of doors of adjacently parked vehicles.

8 Claims, 3 Drawing Sheets

VEHICLE DOOR PROTECTOR

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

SPECIFICATION

To All whom it may Concern be it known that I, Muthukumaran azhagesan, a citizen of India, have invented new and useful improvements in a vehicle door protector as described in this specification.

BACKGROUND OF THE INVENTION

Various types of vehicle door protectors are known in the prior art. However, what is needed is a vehicle door protector that includes a lightweight shell member configued to overlie and superimpose upon a vehicle door, said shell member having a durable exterior surface and a pliable interior surface, wherein the shell member is releasably securable to the vehicle door by means of a plurality of securing straps, whereby the finish and paintwork of the vehicle door to which the device is attached is protected from dings, dents, scratches, and other blemishes rendered thereto by the opening of doors of adjacently parked vehicles.

FIELD OF THE INVENTION

The present invention relates to a vehicle door protector, and more particularly, to a vehicle door protector that includes a lightweight shell member configued to overlie and superimpose upon a vehicle door, said shell member having a durable exterior surface and a pliable interior surface, wherein the shell member is releasably securable to the vehicle door by means of a plurality of securing straps, whereby the finish and paintwork of the vehicle door to which the device is attached is protected from dings, dents, scratches, and other blemishes rendered thereto by the opening of doors of adjacently parked vehicles.

SUMMARY OF THE INVENTION

The general purpose of the vehicle door protector, described subsequently in greater detail, is to provide a vehicle door protector which has many novel features that result in a vehicle door protector which is not anticipated, rendered obvious, suggested, or even implied by prior art, either alone or in combination thereof.

Oftentimes a parked vehicle is susceptible to dings, dents, scratches, and other blemishes rendered to the finish and paintwork of said vehicle caused by an adjacently parked vehicle when a person gets into or out of said adjacently parked vehicle. The longer a particular vehicle is parked in a public parking lot having a high amount of traffic, the more likely a ding, dent, scratch, or blemish is likely when a person, opening a door of an adjacently parked vehicle, accidentally contacts the particular vehicle with the opened door of the adjacently parked vehicle, causing damage to the paintwork and finish of the particular vehicle in question. This is frustrating, and often costly to fix, and more often than not a perpetrator leaves without remunerating for the damage caused or leaving insurance information to cover the costs—and perhaps not deliberately, because sometimes dings, dents, and small scratches caused by a vehicle door are hard to spot off hand.

The present invention, then, has been devised to provide drivers with a lightweight, easy to install vehicle door protector. Most dings, dents, scratches, and blemishes of the type previously discussed are rendered upon the door of the vehicle in question, as most automobile doors are similarly placed relative the overall dimensions of a particular make and model of vehicle relative the space into which a vehicle is parked. The net result of this fact is that the vast majority of blemishes of the type discussed herein occur caused by an opened door of an adjacently parked vehicle contacting a closed door of the particular vehicle in question.

The present invention, then, is configured to be easily installable to cover the exterior of a vehicle door so that, should an adjacently parked vehicle's opened door contact the particular vehicle in question, the overlying vehicle door protector will receive the contact and no damage will be rendered the finish or paintwork of the particular vehicle in question.

The present vehicle door protector includes a polyurethane shell member configured to overlie and superimpose upon a vehicle door. The shell member includes an interior surface and an exterior surface. The interior surface is configured to overlie the exterior of a particular vehicle door without rendering damage thereto. The exterior surface is metallic, or comprised of another durable substance, as desired.

The preferred embodiment of the vehicle door protector disclosed herein includes a cutout window section configured to overlie a vehicle window when the vehicle door protector is installed to a particular door. Vehicle windows are rarely prone to the type of damage discussed herein, and an unobstructed line of sight is desirable from within the particular vehicle in question when the vehicle door protector is installed to a particular door of the particular vehicle in question.

To releasably secure the vehicle door protector to the exterior of a vehicle door, as desired, a plurality of securing straps are included. Each of the plurality of securing straps includes a first portion and a second portion interconnectable by means of a connecting hasp. The first portion of each of the plurality of securing straps is attached to the shell member proximal to an upper edge. The second portion of each of the plurality of securing straps is attached to the shell member proximal to a lower edge of the shell member. Thusly, the first portion is disposed over a particular door of the particular vehicle with which the present device is used, and the second portion is disposed under said vehicle door. The first portion and second portion are then connected by means of the connecting hasp at a point overlying the interior of said door. Thusly, when the door is closed the vehicle door protector is secured to the door exterior and is removable only when the interior of the door is accessed, the connecting hasp is disconnected, and the door is opened to remove each of the plurality of securing straps.

The vehicle door protector is lightweight and readily transportable. The exterior surface of the shell member is considered to be made of aluminum and alternately titanium, or another lightweight metal or alloy. The exterior surface may also be made of a durable plastic or fiberglass. The shell member may be fashioned from a substance other than polyurethane that is lightweight, such as foam, for example, or potentially fiber glass. The scope of the invention is directed to covering the exterior of a vehicle door with at least two securing straps, wherein the vehicle door protector is shaped and configured to superimpose overlying the exterior of the vehicle door.

Thus has been broadly outlined the more important features of the present vehicle door protector so that the detailed description thereof that follows may be better understood and in order that the present contribution to the art may be better appreciated.

Objects of the present vehicle door protector, along with various novel features that characterize the invention are particularly pointed out in the claims forming a part of this disclosure. For better understanding of the vehicle door protector, its operating advantages and specific objects attained by its uses, refer to the accompanying drawings and description.

BRIEF DESCRIPTION OF THE DRAWINGS

FIGURES

Figure 1:
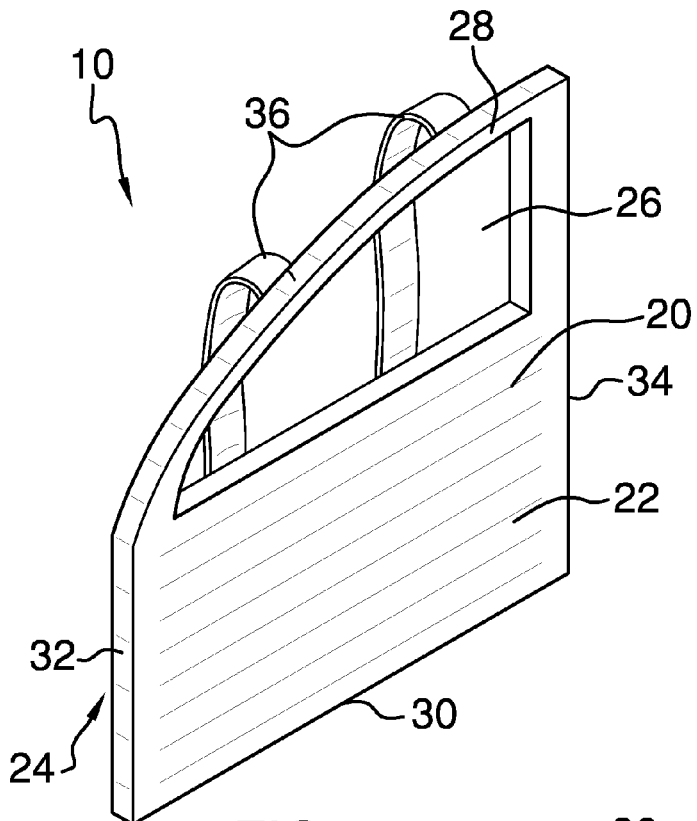

FIG. 1 is an isometric view.

Figure 2:
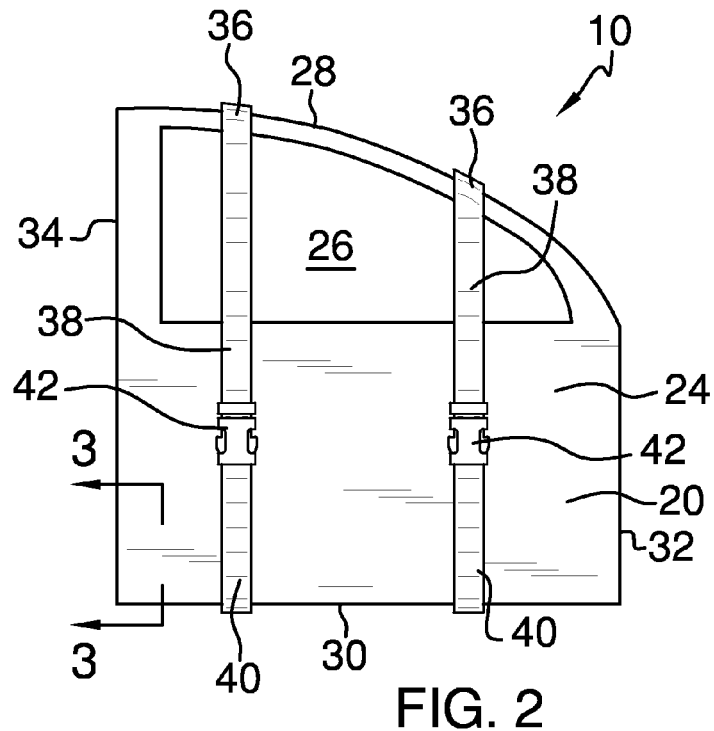

FIG. 2 is a view of an interior surface.

Figure 3:
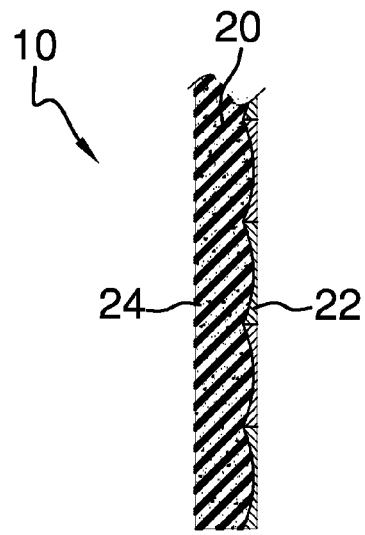

FIG. 3 is a cross-section view taken along the line 3-3 of FIG. 2.

Figure 4:
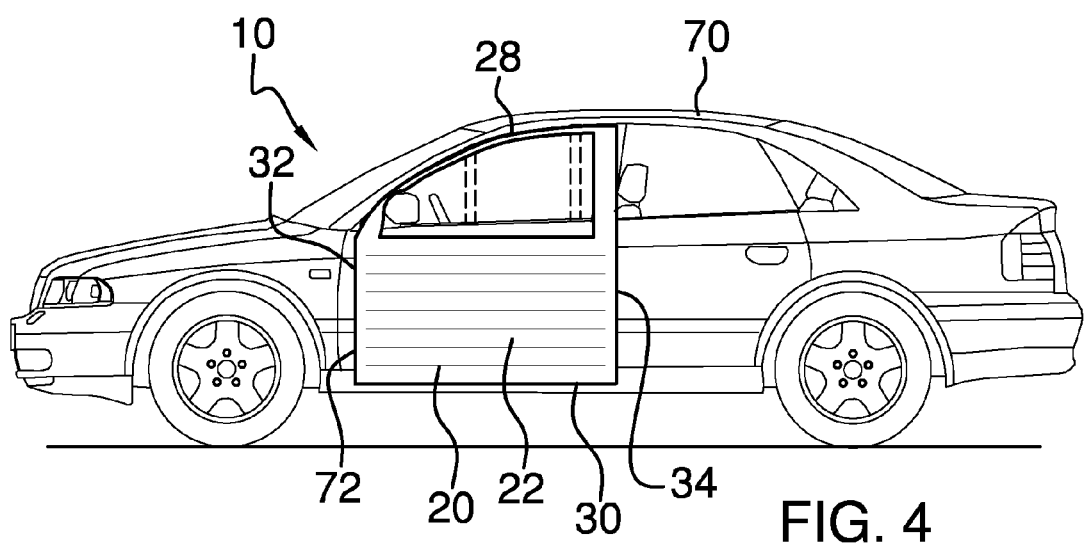

FIG. 4 is an in-use view.

Figure 5:
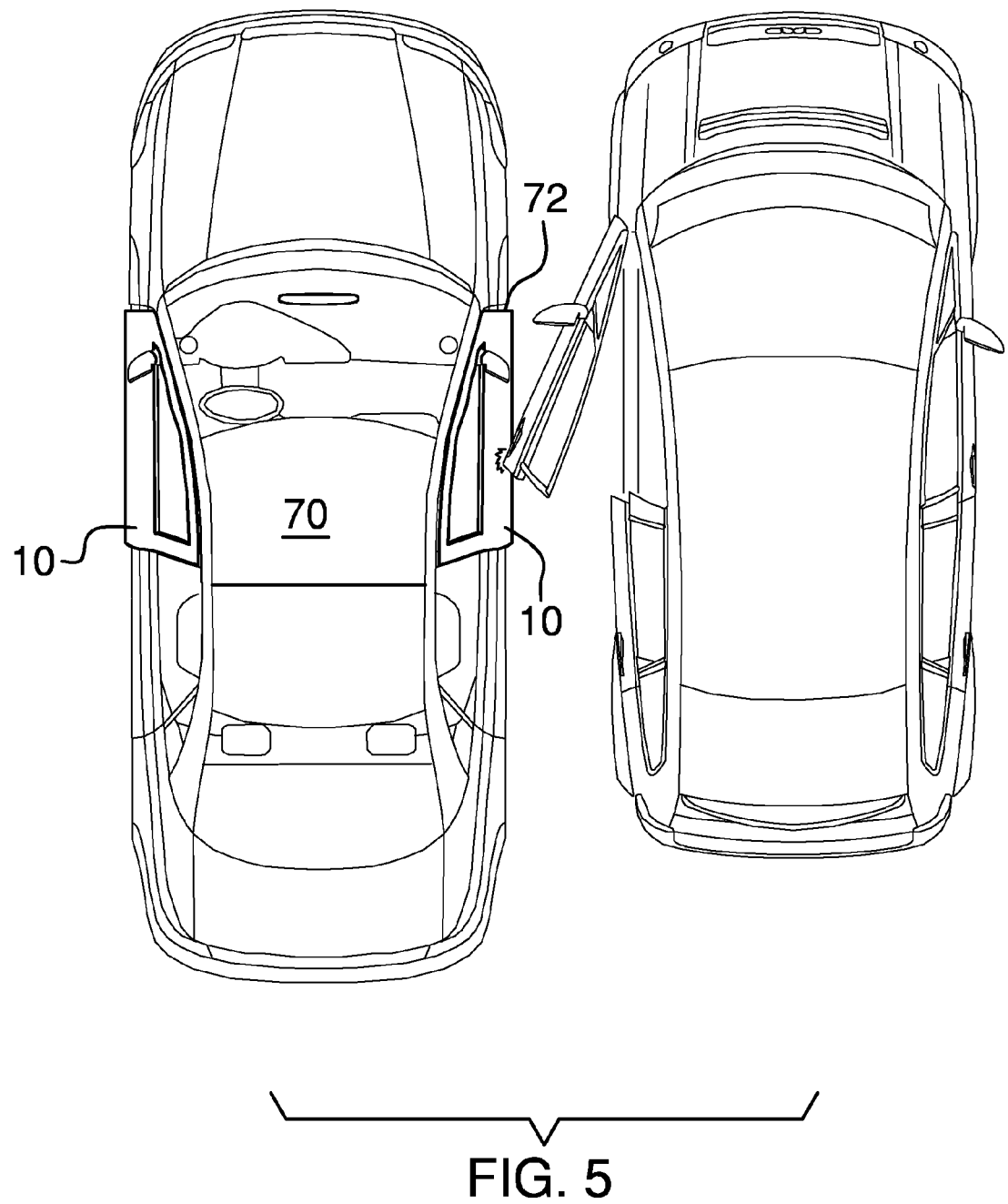

FIG. 5 is a top view.

DETAILED DESCRIPTION OF THE DRAWINGS

With reference now to the drawings, and in particular FIGS. 1 through 5 thereof, example of the instant vehicle door protector employing the principles and concepts of the present vehicle door protector and generally designated by the reference number 10 will be described.

Referring to FIGS. 1 through 5 a preferred embodiment of the present vehicle door protector 10 is illustrated.

The present vehicle door protector 10 has been devised to provide a convenient, easy, lightweight means of protecting the finish of an extant vehicle 70 from dings, dents, chips, scratches, and other blemishes commonly rendered a parked vehicle when parked in proximity to a plurality of other automobiles and road users. Often times, in public parking lots, a car door is dinged, dented, scratched, or otherwise blemished, when an adjacently parked vehicle door is opened to admit or demit someone therefrom. Vehicles parked closely are particularly prone to these incidents. Because most vehicles are manufactured with doors located at similar positions relative the dimensions of the particular vehicle and standard size parking space, the majority of these dings, dents, scratches and other blemishes is rendered by a vehicle door upon an adjacently parked vehicle door. Whereupon, a vehicle door protector 10, easily transportable and readily installable to cover a vehicle 70 door 72, is warranted.

Discussing now the preferred embodiment of the present device, the vehicle door protector 10 includes a single unit construction polyurethane shell member 20 configured to overlie and superimpose upon an entire existing sole vehicle 70 door 72 exterior. The shell member 20 includes a metallic exterior surface 22 and an interior surface 24 configured to overlie the exterior of an extant vehicle 70 door 72 without scratching or damaging said vehicle door 72. The polyurethane shell member 20 is lightweight and durable, and the interior surface 24 of the shell member 20 will not damage or otherwise blemish the exterior of the door 72 upon which the vehicle door protector 10 is installed.

The metallic exterior surface 22 protects the lightweight polyurethane shell member 20. Without the metallic exterior surface 22, the shell member 20 would likely be eroded away, with each ding, dent, scratch or other blemish rendered the shell member 20 pocking the shell member 20. The metallic exterior surface 22, on the other hand, is durable and will hold the shell member 20 together for extended utility while protecting the shell member 20 and vehicle door 72.

A cutout window section 26 is included. The position of windows upon most vehicles renders them unsusceptible to damage from adjacently parked vehicle doors, and covering the window is therefore unnecessary. The window section 26 is a removed section of the shell member 20 configured to overlie an extant vehicle 70 window 74 to permit visibility into and out of the vehicle while a particular vehicle door protector 10 is installed.

The vehicle door protector 10 resembles the shape of the vehicle door 72 with which it is to be used. An upper edge 28 is disposed above the window section 26, the upper edge 28 configured to match the contour of an extant vehicle door 72. A lower edge 30 is configured to match the bottom contour of a vehicle door 72. A front edge 32 is configured to match the front edge of a vehicle door 72. A rear edge 34 is configured to match the rear edge of a vehicle door 72. It is considered that multiple models of vehicle door protectors 10 may be manufactured, each configured to overlie and superimpose upon a particular vehicle door.

To releasably secure the vehicle door protector 10 to a desired vehicle door, each of a plurality of securing straps 36 is included to releasably secure the vehicle door protector 10 overlying the entire exterior of an existing sole vehicle 70 door 72. Each of the plurality of securing straps 36 includes a first portion 38 and a second portion 40. The first portion 38 is attached to the shell member 20 proximal the upper edge 28 and the second portion 40 is attached to the shell member 20 proximal the lower edge 30. The first portion 38 is releasably connectable to the second portion 40 by means of a connecting hasp 42.

Each of the plurality of securing straps 36 therefore releasably secures the shell member 20 overlying the exterior of a vehicle door 72 when each of the first portion 38 is passed over the door 72 and the second portion 40 is passed under the door 72, the first and second portions 38, 40 then connected together by means of the connecting hasp 42 on the interior side of the door 72. When the door 72 is then closed, the shell member 20 cannot be removed without the door 72 being opened and the connecting hasp 42 released. It should be noted that the length of each of the first portion 38 and second portion 40 is adjustable, as desired, to tightly fit the vehicle door protector 10 to the exterior of a vehicle 70 door 72, as desired.

Each securing strap 36 therefore releasably secures the vehicle door protector 10 to the exterior of a vehicle 70 door 72 and the metallic exterior surface 22 protects the finish and paintwork of the vehicle 70 with which the present vehicle door protector 10 is used from dings, dents, scratches, or other blemishes commonly rendered to a vehicle 70 when said vehicle 70 is parked in proximity to other automobiles and other road users.

What is claimed is:

1. A vehicle door protector comprising:
   a single unit construction shell member configured to overlie and superimpose upon substantially an entire sole vehicle door exterior;
   an exterior surface overlying the shell;

a plurality of securing straps configured to releasably securably fasten the vehicle door protector to the exterior of said vehicle door;
wherein the exterior of said vehicle door is protected from dings, dents, scratches, and other blemishes common to paintwork while said vehicle is parked in proximity to other automobiles and road users;
wherein the shell member further comprises:
an interior surface configured to overlie the exterior of the vehicle car door;
a window section cutout from the vehicle door protector, said window section configured to overlie a window of said vehicle;
an upper edge disposed above the window section, the upper edge configured to overlie a contour of the vehicle door;
a lower edge configured to match a bottom contour of the vehicle door;
a front edge configured to match a front edge of the vehicle door;
a rear edge configured to match a rear edge of the vehicle door;
each of the plurality of securing straps comprising a first portion and a second portion, said first portion releasably connectable to the second portion;
wherein each securing strap first portion is attached to the shell proximal the upper edge and the second portion is attached to the shell proximal the lower edge whereby the shell member is releasably secured to the exterior of the vehicle door when each of the first portion and second portion are releasably secured together around the vehicle door.

2. The vehicle door protector of claim 1 wherein the shell member is a polyurethane shell configured to contact the exterior of said vehicle door without scratching said exterior.

3. The vehicle door protector of clam 1 wherein the plurality of securing straps are secured together on the interior side of the vehicle door by means of a connecting hasp whereby the vehicle door protector is removable only when the interior side of the vehicle door is accessed.

4. The vehicle door protector of claim 3 wherein the exterior surface is metallic.

5. The vehicle door protector of claim 3 wherein the shell member is made of foam.

6. The vehicle door protector of claim 3 wherein the shell member is made of fiberglass.

7. The vehicle door protector of claim 3 wherein the exterior surface is made of a durable polymer.

8. A vehicle door protector comprising:
a single unit construction shell member configured to match and superimpose substantially an entire sole vehicle door exterior; said shell member comprising:
a metallic exterior surface;
an interior surface configured to overlie the exterior of the vehicle door without scratching or damaging said vehicle door;
a cutout window section, said window section configured to match an extant vehicle window when the shell member is releasably secured to a vehicle door;
an upper edge disposed above the window section, the upper edge configured to match a contour of the vehicle door;
a lower edge configured to match a bottom contour of the vehicle door;
a front edge configured to match a front edge of the vehicle door;
a rear edge configured to match a rear edge of the vehicle door;
each of a plurality of securing straps comprising a first portion and a second portion, the first portion attached to the shell member proximal the upper edge, the second portion attached to the shell member proximal the lower edge, said first portion releasably connectable to the second portion by means of a connecting hasp;
wherein each securing strap releasably secures the vehicle door protector to the exterior of the vehicle door and the metallic exterior surface is configured to protect the finish and paintwork of the vehicle from dings, dents, scratches, or other blemishes commonly rendered to the vehicle when said vehicle is parked in proximity to other automobiles and other road users.

* * * * *